United States Patent
Wang et al.

(10) Patent No.: US 9,144,758 B2
(45) Date of Patent: Sep. 29, 2015

(54) DEFOAMING COMPOSITION FOR HIGH ACID STRENGTH MEDIA

(75) Inventors: Guoxin Wang, Mulberry, FL (US);
Jeffrey Walker, Mulberry, FL (US);
Timothy Cameron, Mulberry, FL (US)

(73) Assignee: Arr-Maz Custom Chemicals, Inc., Mulberry, FL (US)

( * ) Notice: Subject to any disclaimer, the term of this patent is extended or adjusted under 35 U.S.C. 154(b) by 956 days.

(21) Appl. No.: 13/106,217

(22) Filed: May 12, 2011

(65) Prior Publication Data
US 2011/0278496 A1    Nov. 17, 2011

Related U.S. Application Data

(60) Provisional application No. 61/334,621, filed on May 14, 2010.

(51) Int. Cl.
*B01D 19/04* (2006.01)
*C01B 25/22* (2006.01)

(52) U.S. Cl.
CPC ........ *B01D 19/0418* (2013.01); *B01D 19/0404* (2013.01); *C01B 25/22* (2013.01)

(58) Field of Classification Search
CPC .... B01D 19/02; B01D 19/04; B01D 19/0404; B01D 19/0418; B01D 19/0481; B01D 1/08; B01D 3/12; B01B 1/02; B01B 1/04; C01B 25/22; C01B 25/225; C01B 25/234; C01B 25/232; C01B 25/235
USPC ...................... 516/125; 423/320, 321.1, 157.4
See application file for complete search history.

(56) References Cited

U.S. PATENT DOCUMENTS

| | | | | |
|---|---|---|---|---|
| 2,097,121 A * | 10/1937 | Fromm | .................... | 162/179 |
| 2,453,352 A * | 11/1948 | Tremain et al. | .................... | 516/126 |
| 2,564,332 A * | 8/1951 | Kellogg | .................... | 426/334 |
| 2,727,009 A * | 12/1955 | Jursich | .................... | 516/125 |
| 2,762,780 A * | 9/1956 | Kulakow | .................... | 516/133 |
| 2,923,687 A * | 2/1960 | Jursich | .................... | 516/125 |
| 2,988,504 A * | 6/1961 | Mazurek | .................... | 210/727 |
| 3,000,835 A * | 9/1961 | Mayhew et al. | .................... | 516/133 |
| 3,004,923 A * | 10/1961 | Jursich | .................... | 516/132 |
| 4,316,916 A * | 2/1982 | Adamer | .................... | 426/329 |
| 4,609,490 A * | 9/1986 | Itoh et al. | .................... | 516/132 |
| 5,156,879 A | 10/1992 | Evans | | |
| 5,223,294 A * | 6/1993 | Takenawa | .................... | 516/125 |
| 5,407,080 A * | 4/1995 | Welch et al. | .................... | 209/166 |
| 5,482,529 A * | 1/1996 | Ahlnas et al. | .................... | 71/33 |
| 5,637,337 A * | 6/1997 | Ueda et al. | .................... | 426/329 |
| 5,824,132 A * | 10/1998 | Kopyleva et al. | .................... | 71/43 |
| 6,468,576 B1 * | 10/2002 | Sher et al. | .................... | 426/565 |
| 6,544,489 B2 | 4/2003 | Cameron | | |
| 6,805,242 B2 * | 10/2004 | Sotillo | .................... | 209/4 |
| 7,273,103 B2 * | 9/2007 | Szymaski et al. | .................... | 166/300 |
| 7,893,115 B2 * | 2/2011 | Cheng et al. | .................... | 516/117 |

(Continued)

OTHER PUBLICATIONS

Masuda, "Chapter 17, Flavor Stability of Tea Drinks", Tea and Tea Products: Chemistry and Health-Promoting Properties, Edited by Chi-Tang Ho et al, CRC Press, Jul 9, 2008, pp. 275-300.*

(Continued)

*Primary Examiner* — Daniel S Metzmaier
(74) *Attorney, Agent, or Firm* — Head, Johnson & Kachigian, P.C.

(57) ABSTRACT

All natural defoaming compositions useful in high strength acid media utilizing phosphatide emulsifiers that are considerably more effective at reduced application rates than prior art compositions are described.

12 Claims, 6 Drawing Sheets

Comparison of Defoaming Properties

| Defoamers | Solids (%) | Dose (kg/T) | Defoaming property (% aqueous surface) | Anti-foaming Property (% aq. surf. @ 5 min) | Anti-foaming Property (% aq. surf. @ 8 min) | Duration of anti-foaming (minutes) | Relative Effectiveness (0-10) |
|---|---|---|---|---|---|---|---|
| Tall oil fatty acid | 100 | 0.6 | 0 | 0 | 0 | 0 | 0 |
| Tall oil fatty acid soap | 20 | 0.6 | 60 | 0 | 0 | 5 | 3 |
| AMCC emulsion defoamer, D-200 | 32 | 0.6 | 60 | 40 | 0 | 8 | 5 |
| AMCC emulsion defoamer, D-200 | 32 | 1.8 | 80 | 80 | 80 | 10 | 9 |
| DF-89 | 20 | 0.6 | 90 | 80 | 80 | 10 | 10 |
| DF-35 | 100 | 0.6 | 90 | 80 | 70 | 10 | 9 |

(56) References Cited

U.S. PATENT DOCUMENTS

| | | | |
|---|---|---|---|
| 2003/0050492 A1* | 3/2003 | Copeland et al. | 554/204 |
| 2004/0009274 A1* | 1/2004 | McCampbell | 426/330 |
| 2006/0128816 A1* | 6/2006 | Cheng et al. | 516/56 |
| 2007/0054968 A1* | 3/2007 | Scoggins | 516/125 |

OTHER PUBLICATIONS

Lentner et al., "Organic Acids in Coffee in Relation to the Degree of Roast", Journal of Food Science, vol. 24, Iss. 5, pp. 483-492 (Sep. 1959).*

Lewis, Richard J., Sr. (2002) Hawley's Condensed Chemical Dictionary (14th Edition), John Wiley & Sons, Online @ http://app.knovel.com/web/toc.v/cid:kpHCCDE006/viewerType:toc/root_slug:hawleys-condensed-chemical/url_slug:hawleyscondensed-chemical/?, headword = lecithin, (Knovel Release Date: Sep 4, 2003; downloaded Jan. 2, 2014, 2013), pp. 1 of 1.*

By Anne Marie Helmenstine, Ph.D, Is a Negative pH Possible? About.com @ http://chemistry.about.com/od/acidsbase1/f/negative-ph.htm (Downloaded Aug. 25, 2014), pp. 1-4.*

* cited by examiner

Generalized Phospholipid where $R_1$ and $R_2$ are $C_{16}$ to $C_{18}$ fatty residues and X = PC, PE, PI, or PA as follows:

FIG. 2

| Table I | | | |
|---|---|---|---|
| Typcal levels and phospholipid distributions for common oilseeds | | | |
| | Soy Oil | Canola Oil | Sunflower Oil |
| P (ppm) | 400-1200 | 200-900 | 300-700 |
| PC (-choline) | 12%-46% | 25%-40% | 29%-52% |
| PE (-ethanolamine) | 8%-34% | 15%-25% | 17%-26% |
| PA (-acid) | 2%-21% | 10%-20% | 15%-30% |
| PI (-inositol) | 2%-15% | 2%-25% | 11%-22% |

FIG. 3

Table 2. DF-35 and DF-89 Laboratory Defoamer Comparison

| # | Defoamer | Visible Aqueous surface (%) < 5 min | Comments |
|---|----------|--------------------------------------|----------|
| 1 | DF-35 | 60 | Good |
| 2 | DF-89 | 80 | Better |

Laboratory Defoamer Comparison Tests

FIG. 5

Comparison of Defoaming Properties

| Defoamers | Solids (%) | Dose (kg/T) | Defoaming property (% aqueous surface) | Anti-foaming Property (% aq. surf. @ 5 min) | Anti-foaming Property (% aq. surf. @ 8 min) | Duration of anti-foaming (minutes) | Relative Effectiveness (0-10) |
|---|---|---|---|---|---|---|---|
| Tall oil fatty acid | 100 | 0.6 | 0 | 0 | 0 | 0 | 0 |
| Tall oil fatty acid soap | 20 | 0.6 | 60 | 0 | 0 | 5 | 3 |
| AMCC emulsion defoamer, D-200 | 32 | 0.6 | 60 | 40 | 0 | 8 | 5 |
| AMCC emulsion defoamer, D-200 | 32 | 1.8 | 80 | 80 | 80 | 10 | 9 |
| DF-89 | 20 | 0.6 | 90 | 80 | 80 | 10 | 10 |
| DF-35 | 100 | 0.6 | 90 | 80 | 70 | 10 | 9 |

FIG. 6

Comparison of Phospholipid Spiked DF-89 Samples

| I.D. Run | Formulation (%) | | | | | Defoaming Test |
|---|---|---|---|---|---|---|
| | DF-89 CTRX 21516 (28.13% solids) | Interface Phospholipids | Lecithin Powder | Water | Total | Relative Performance |
| I | 83.40 | 0.00 | 2.50 | 14.10 | 100.00 | excellent |
| J | 83.30 | 2.50 | 0.00 | 14.20 | 100.00 | excellent |
| K | 100.00 | 0.00 | 0.00 | 0.00 | 100.00 | poor |

DEFOAMING COMPOSITION FOR HIGH ACID STRENGTH MEDIA

RELATED APPLICATION

This application claims the benefit of U.S. provisional patent application Ser. No. 61/334,621 filed May 14, 2010.

FIELD OF THE INVENTION

The invention relates to the field of defoamers which control foam in high acid strength media, in particular as it exists in the "wet process" synthesis of phosphoric acid.

DESCRIPTION OF THE RELATED ART

In the manufacture of phosphoric acid by the method commonly referred to as the "wet process," phosphate rock is digested with sulfuric acid and concentrated to yield free phosphoric acid and gypsum. Most often, the process results in the generation of foam, which is believed to arise from the interaction between residual organic matter in the phosphate rock and gases or vapors released during the digestion reaction. To maximize the efficiency of the "wet process," it is necessary to add defoamers in the reaction.

In the mid to late 1970's and even later 50% active aqueous defoamers based upon easily sulfonated oleic or tall oil fatty acid (TOFA) were commonplace. High defoamer consumption, owing to only moderate surface activity, characterized their use. However, rubber digester liner failures and costly plant shut downs from more surface active products were averted. Later, in the early 1980's with improvements in liner materials and construction, more non-sulfonated products began to appear. These non-aqueous products were based primarily upon various tall oil fatty acid fractions and derivatives and were referred to as "oil-based" or "concentrate" defoamers. They were indeed effective at a fraction of the dosage of their sulfonate counterparts. Still, however, the fears of rubber swell and degradation persisted at a number of chemical plants, so lower 25-30% solids aqueous emulsions products followed. Typically, they were similar to the concentrates but possessed enhanced dispersant systems. Performance usually was equal to the concentrates with less "fatty matter." It was reasoned that all else being equal, these products would lead to less potential rubber degradation. Common surfactant combinations employed were soaps and non-ionic surfactants, all usually TOFA derived. During these years multiple patents, addressing the use of various surfactants for this application, were published. An early very successful emulsion called D-200 was offered by ArrMaz Products of Winter Haven, Fla.

In the mid 1980's, as rubber related concerns further abated, emphasis on improving concentrate reagent performance again accelerated. This has continued until the present day, where little emulsion, if any, is sold. The driving forces were two-fold. First, was cost reduction by the elimination of shipping water and second, a changing raw material supply which complicated stable emulsion manufacture.

The emulsifier "packages" that have enabled the growth in concentrate defoamers are multi-component and often manufactured in-house by the defoamer supplier for reasons of cost. All contain petroleum derivatives. One well-known dispersant is prepared by the condensation of polyethylene polyamines and TOFA. The resultant fatty amidoamines possess good acid stability and excellent dispersant activity, but as a class, are potent aquatic toxins. The balance of a formulation normally consists of free fatty acid as well as other fatty derivatives, rosins and so-called "neutrals" among others. An example of a concentrate developed at that time and still available today from ArrMaz Custom Chemicals of Mulberry, Fla. is defoamer DF-35. More historical information on defoamers used in this application is contained in our earlier U.S. Pat. No. 6,544,489 to Cameron. Taken altogether then, today's wet process defoamers, though quite effective, are complex blends of both reacted and non-reacted products, containing natural and synthetic components and recognized environmental hazards. Obviously, it would be useful to have a defoamer which is not only more cost effective, but simpler to manufacture and non-toxic, unlike the wet process phosphoric acid defoamers currently available.

SUMMARY OF THE INVENTION

It is therefore an object of the invention to provide a defoamer which possesses significantly improved cost performance than those currently available.

It is another objective of the invention to provide a defoamer that not only can be produced from readily available raw materials but also does not require complex chemicals reaction steps or sophisticated manufacturing equipment.

It is another object of the invention to provide a defoamer that can be solely based on natural products, which are non-toxic to the environment and will not degrade rubber lining used in the production of wet process phosphoric acid.

To achieve these and other objects, the invention is directed toward an aqueous defoaming composition useful in high strength acid media, comprising phospholipid derivative emulsifiers. In addition to the phospholipid emulsifiers are used fatty acids and ester derivatives. Of primary importance are the uses of phospholipid containing by-product sources derived from edible oil processing. These include, among others, soapstock, acidulation interphase, lecithin containing sludges and vegetable oil phospholipids. Depending on the source, the phospholipid containing base may already contain sufficient non-phospholipid fatty derivatives, such that only aqueous dilution and pH modification are necessary to be effective. Others may require additional additives to enhance product stability or appeal. All phospholipid bases are readily available at relatively low cost. When adequately formulated, these natural compositions are as effective as commercially available products for wet process phosphoric acid defoaming at surprisingly low activity.

BRIEF DESCRIPTION OF THE DRAWINGS

FIG. 2 is a table showing typical levels and phospholipid distributions for common oilseeds;

FIG. 3 is a table showing a DF-35 and DF-89 Laboratory Defoamer Comparison;

FIG. 5 is a chart showing various comparisons of defoaming properties; and

FIG. 6 is a chart showing a comparison of phospholipid spiked DF-89 samples.

DETAILED DESCRIPTION OF THE INVENTION

Figure 1:
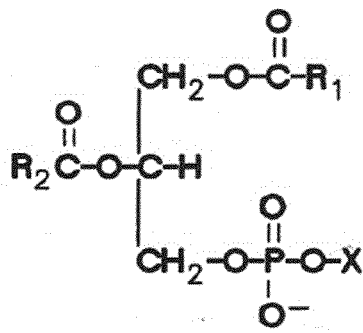
FIG. 1 is a representative formula for a generalized phospholipid.
Figure 1:
Figure 1:
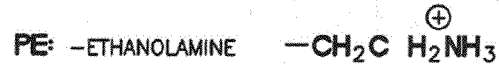
Figure 1:
Figure 1:
Figure 1:
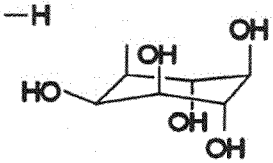

The compositions, which are the objects of this invention, are derived initially from the refining of edible oils. In the process, natural oils are contacted with water initially in a process referred to as degumming. Here, water forms adducts with phospholipid matter, rendering them removable as solid gums via centrifugation. These gums, also known as lecithin sludge, are sometimes further processed to give lecithin, a natural food emulsifier. The oil phase is further refined in chemical refining by washing with a dilute alkali to remove free the fatty acids as soaps. This wet lipid mixture is termed soapstock. Usually, gums not upgraded to lecithin are incorporated into the soapstock as well. Soapstock also contains some free fatty acid, as soapstock pH is insufficiently high for complete neutralization. Also present are mono-, di- and triglycerides, various phosphatides beyond that derived from the original degumming operation, minerals, possibly meal fines and other matter.

Depending on the vegetable source and processing conditions soapstock may exist anywhere from a liquid to semisolid paste with an emulsion like appearance. Solids can vary from 15 to 70%, pH's from 7-10 and viscosities from 50 to 7500 cps or greater, at which times temperatures of 60° C. or higher may be required to insure fluidity. Finally, soapstock often possesses a rancid odor, owing to the ready biodegradation that accompanies aqueous phospholipid products. Beyond what is directly sprayed on animal feed it is little wonder that the great bulk of soapstock is promptly acidized by addition of sulfuric acid to liberate the free fatty acids, now called acid oil or acidulated soapstock. The acid oil or acidulated soapstock is a readily salable (87+% total fatty acid) commodity. It does not possess the variances in composition, handling and both oxidative and biological instability so characteristic of soapstock itself.

Also produced during acidulation is a so-called "interphase" and aqueous brine layer. The interphase layer typically contains the non-oil and water soluble phosphatic gums along with some entrained acid oil. Their compositions can vary dramatically based upon soapstock plant source and soapstock separation equipment, prior refining processor and process conditions, and age prior to acidulation. Interphase layer concentrates are often limed and subsequently landfilled.

Another source of phospholipids can come from lecithin sludge, which has been upgraded for commercial use. This normally entails drying to reduce water content to about 1.5% or less. The resultant "pasty" compositions are often fluidized by addition of a small amount of vegetable oil. Free fatty acids or other fatty derivatives find use here as well. In this form, these usually dark products are referred to as vegetable oil phospholipids (VOP). Naturally further refining by deoiling, bleaching, fractionation, and hydrolysis or by other processing will furnish higher quality and a greater variety of differentiated products. Most, because they are naturally derived, are used primarily in the food and cosmetic industries.

A closer examination of the phosphatides present in all of the stated sources is shown in the generalized chemical structure below. Usually, depending upon the vegetable source, phosphatidylcholine (PC) and phosphatidylethanolamine (PE) make up the largest portion. This is followed by phosphatidylinositol and phosphatidic acid, PI and PA respectively. FIG. 1 is a generalized phospholipid formula. Table 1 (see FIG. 2) details typical ranges for these phospholipids in several plant sources. In terms of emulsifier abilities, PC and PE are regarded as strong, while PI and PE are considerably weaker.

For soapstock to be consistently operable as a wet process defoamer raw material, we have found that the candidate vegetable soapstocks preferably:

a. are derived primarily from soya, canola, cottonseed or mixtures thereof,
 b. possess organic solids of 15% to 20% or more, and
 c. have viscosities from 50 to 1000 cps.
 d. possess a phospholipid content of at least 2% to 5% or more based upon the total fatty acid and acylglycerol content of the soapstock.

This is not to say that specification outside these ranges can't be utilized. We believe these to be practical guidelines only. Where initial solids are low, it may be by agreement with suitable suppliers that they be diverted for acidulation or that at the defoamer suppliers locations sufficient additional higher solids containing soapstock be available as to blend out differences. On this note we have found that blending of soapstocks for this end use serves to minimize relative performance difference and viscosity issues. Finally, to reduce rancidity, it is important to adjust and maintain pH of 11.0 and more preferably of 11.2. U.S. Pat. No. 5,156,879 to Evans discloses other means to both minimize viscosity and rancidity, while increasing soapstock emulsion stability.

For the purposes of illustrating the effectiveness of the invention, several laboratory tests and plant trials were run and compared to currently available commercial defoamers. In the laboratory work the test procedure outlined below was closely followed. The goal of the test is to relatively assess the extent and stability of foam produced during phosphoric acid production, and to evaluate the ability of defoamers to break the foam and to suppress its reformation.

Laboratory Procedure

The apparatus consists of a 1-liter graduated glass cylinder to contain the rock-acid slurry. An air dispersion tube is submersed in the slurry with compressed air of airflow rate set to 0.5 liter per minute. The graduated cylinder is submersed in a water bath heated to boiling. These conditions are maintained throughout the testing.

Each evaluation is performed as indicated:

300 ml mixed acid solution (sulfuric acid and phosphoric acid) is added into the dry 1 L graduated cylinder. Then 20 g rock is added to the mixture, the cylinder is tilted to about 45 degrees and the mixture is shaken vigorously for 20 times and the cylinder is placed in the boiling water for 17 minutes.

The cylinder is quickly lifted from the water bath and shaken every 2 minutes for the first 6 minutes and then after 4 and 5 minutes until 15 minutes. After 15 minutes, it is heated for an additional 2 minutes followed by placing the dispersion tube in the cylinder.

After heating for 17 minutes the dispersion tube was placed in the cylinder and the foam was allowed to rise to 1000 mL. Then the defoamer was added with the help of a syringe. The following characteristics were observed and recorded at various time intervals:

An estimate of the visible aqueous surface (%): the greater the percent surface visible, the better the antifoaming agent.

Aqueous boundary plus foam height.

Bubble size and bubble properties: larger bubbles indicate the foam is unstable and the defoamer is still effective.

A score was then developed for each characteristic and compiled into an overall rating.

Example I

Table 2 (see FIG. 3) details comparative performance of a conventional concentrate defoamer (DF-35) versus the inventive defoamer (DF-89) using an Eastern European phosphate rock with 18% $P_2O_5$. DF-35 is Arr-Maz Custom Chemicals tailor-made defoamer used in Florida wet process phosphoric acid production for comparison. Total fatty acid content including free and derivatized in the DF-35 runs about 85%. A fatty amidoamine assists as an emulsifier. Defoamer DF-89 is 100% diluted aqueous based emulsion derived from vegetable soapstock. The base soapstock possessed "as is" solids of 54%. From the results, the DF-89 gave significantly higher visible aqueous surface at about five minutes than the standard DF-35, suggesting better antifoam properties.

Figure 4:
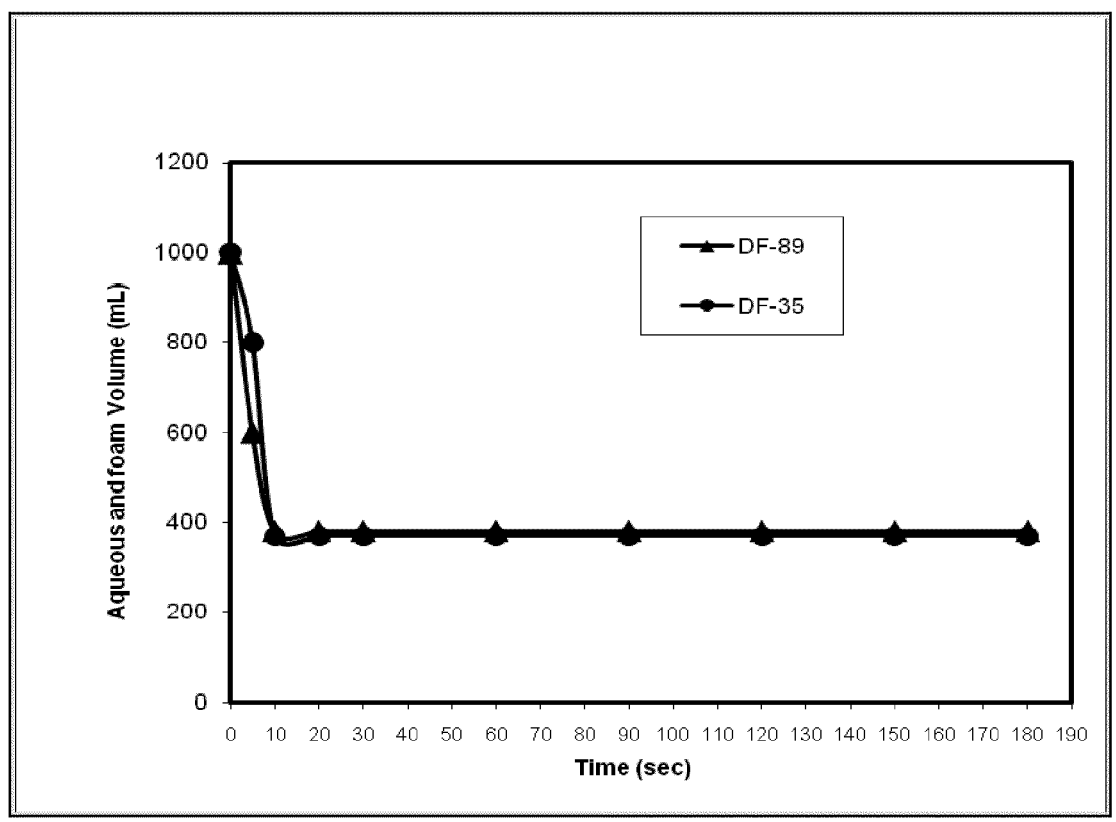
FIG. 4 is a graph showing laboratory defoamer comparison tests.

Table 2 further shows the DF-89 generated a larger aqueous surface area and stronger defoaming ability than DF-35. As is seen in FIG. 4, DF-35 is able to drop the foam level to below 800 mL in first 5 seconds and then the aqueous and foam level is maintained at 370 mL. DF-89 showed a very fast breakdown of foam to a level of 600 mL after 5 seconds. The result shows that the soy soapstock defoamer DF-89 is much more effective than the conventional defoamer DF-35. Only 1 drop of the two defoamers (approximately weighing 0.012 g) was sufficient to break the foam as well as suppress them from further formation, which is about 1 kg/t of rock with 31% $P_2O_5$.

FIG. 4 also demonstrates the ability of the DF-89 defoamer to break foam. Within 5 seconds, DF-89 was able to reduce foam levels to below 600 mL, somewhat better than the DF-35. Thereafter, both defoamers were able to maintain foam at a level at 370 mL.

Example II

Defoamer tests were conducted similarly with free fatty acids, caustic neutralized fatty acids and an emulsion defoamer D-200 and compared to both DF-35 and DF-89. As seen in FIG. 5, free fatty acids and soaps are ineffective. The standard D-200 emulsion was effective at three times the dose of the inventive DF-89 defoamer. And in this lab test the DF-89 performed as well as the DF-35 standard at one-fifth of the solids.

In another set of experiments, samples of an older biologically degraded DF-89 defoamer were spiked with a phospholipid sample isolated from acidulated soapstock interphase and commercial lecithin powder. The acid oil interphase was provided by Gold Coast Commodities (Brandon, Miss.) and the lecithin powder from Mountain Rose Herbs (Eugene, Oreg.). Both samples were subsequently tested along with the degraded DF-89 to determine whether defoamer performance could be restored. Note the lecithin powder is soy derived and has been deoiled. Phosphatide analysis of the lecithin powder was: PC 23%, PE 19%, PI 14%, and PA 8%. FIG. 6 shows our results along with the formulation data. All formulations were adjusted to pH 11.2, prior to evaluation.

From FIG. 6 it can be seen that both spiked phospholipid samples performed excellently, when compared to the degraded standard, which was also at higher solids. That the phospholipids derived from the interphase yielded the same results is not surprising in that the interphase gums were also soy derived. As such, they would be expected to have similar phosphatide profiles in the main.

Example III

In yet another example a commercial vegetable oil phospholipid (VOP) sample was obtained from SVM (Inglis, Fla.) averaging 47% lecithin, 13.5% soy fatty acids and 30% soy vegetable oil. It was formulated into defoamer by adding 25 parts of 75/25 VOP/Acid Oil to 73 parts water and 2% parts of 50% caustic. Defoaming performance was good compared to our standard 100% active DF-35 Defoamer.

It should be noted that lab tests are just that. In the real world digesters are continuous operations, employing lengthy reaction times (many hours) and recycle acid systems. Their nature thus puts a premium on the antifoaming and stability properties possessed by an emulsifier. Emulsifier recycle or "carry through" is important. The lack of this ability is believed to be the reason for the failure of "soaps," since they become protonated under the strongly acid conditions that exist in the digester. Where a product does contain a less optimum emulsifier (s), it is sometimes possible for emulsifier(s) to build up in the recycle acid and act as a "profoamer." This can lead to costly plant shut downs. Further, where insufficient antifoaming exists, higher defoamer consumption usually prevails. Given the difference between lab tests and plant operations, the ultimate determination of a potential defoamer's worth necessitates actual plant trials, often at several locations.

INDUSTRIAL TESTS

Example IV

Defoamer DF-89 plant tests were conducted at Florida phosphoric acid facilities. The plants were being controlled by the Automatic Process Control system, with no operator intervention. Prior to the start of the test, DF-35 was being used, with no defoamer related problems. The arrangements were made to separate the DF-89 from the customers defoamer delivery system with a portable pump and hoses discharging into the same digester compartment as the regular supply system. The formulation tested contained roughly 25% soapstock solids, water and caustic to give initial pHs above 11.

Specifically, the DF-89 feed rate to a plant digester in the Florida area was started at 0.5-1.0 kg/t of $P_2O_5$ and the test was performed at that rate. There were no negative results observed during the 6 hours, 48 hours, and 72 hours tests, respectively. The amps on both flash cooler pumps were consistent with the cycling of the plant itself. Visible foam on the slurry samples was less than normal. DF-89 was concluded to perform very well at controlling both surface foam and entrained gas in the slurry at a similar level of usage to DF-35. Even at start-up during the 72 hours plant trial using DF-89, there was no excessive surface foam and digester overflow with rate of 0.7 kg/ton, while DF-35 dosage was usually increased up to 1.4 kg/ton or more to overcome the upset conditions.

Example V

At another Florida plant, 10% of the soapstock solids were replaced with an equal amount of solids originating from interphase. Use of propionic acid and sulfuric acid to give a final pH of 5.5 were used as per U.S. Pat. No. 5,156,879 to Evans. Performance was equal to our DF-35.

Example VI

In a final test at the same plant a formulation containing 18.8% VOP, 6.3% acid oil and 4.5% caustic and the balance water, was tested against the DF-35 standard. Again, results were similar.

Historically, defoaming products containing both free fatty acids and soaps are well known to the wet process phosphoric acid industry. However, their viability in this application requires that emulsifiers be added to the defoamer formulation. The emulsifiers in DF-89, presently phosphatide derivatives, are new for this industry and possess structures that ostensibly imbue to the soapstock raw material, or other fatty acid and ester derivatives, performance that has not been achieved previously. This is surprising in light of the known acid lability of phosphatides under acidic conditions. This is certainly the case here, where calcium phosphate rock is digested in the presence of strong, sulfuric and phosphoric acids, at elevated temperatures of 190+° F. and long cycle times.

While the invention has been described herein with reference to particular embodiments thereof, and specific examples, a latitude of modifications, various changes and substitutions are intended in the foregoing disclosure, and in some instances some features of the invention will be employed without a corresponding use of other features without departing from the scope of the invention as set forth.

What is claimed is:

1. A method for controlling foam in the manufacture of phosphoric acid, the method comprising the steps of:
   combining sulfuric acid and phosphate rock: and
   adding a defoaming effective amount of a defoaming composition comprising naturally derived vegetable phospholipid emulsifiers,
   wherein said phospholipid emulsifiers are by-products derived from edible vegetable oil processing.

2. The method according to claim 1, wherein said vegetable oil sources are selected from the group consisting of soya, canola, cottonseed and mixtures thereof.

3. The method of claim 1, wherein said phospholipid emulsifiers contain in part a naturally derived phosphatidylcholine, a phosphatidylethanolamine, or combinations of said phosphatidylcholine and said phosphatidylethanolamine.

4. The method of claim 3, wherein the phosphatidylcholine and phosphatidylethanolamine comprise from about 1% to 15% by weight of the defoaming composition.

5. The method of claim 3, wherein the phosphatidylcholine and phosphatidylethanolamine comprise from about 5% to 10% by weight of the defoaming composition.

6. The method of claim 1, wherein said composition further comprises an emulsifiable oil phase.

7. The method of claim 6, wherein the oil phase consists of primarily of $C_{16}$ to $C_{18}$ saturated and unsaturated fatty acids and fatty ester derivatives.

8. The method of claim 7, wherein the fatty acids are derived from vegetable oil sources, tall oil sources, or combinations thereof.

9. The method of claim 7, wherein the fatty esters are derived from vegetable oil sources, tail oil sources, or combinations thereof.

10. The method of claim 7, wherein the fatty esters are derived from fatty acids and glycerol.

11. The method of claim 1, wherein said composition comprises a vegetable oil derived soapstock by-product.

12. The method of claim 1, wherein said composition comprises an acidulated soapstock sludge by-product.

* * * * *